United States Patent [19]
Gundy

[11] Patent Number: 5,641,256
[45] Date of Patent: *Jun. 24, 1997

[54] ANCHORING DEVICE FOR A THREADED MEMBER

[75] Inventor: William P. Gundy, Milford, N.H.

[73] Assignee: NPC, Inc., Milford, N.H.

[*] Notice: The term of this patent shall not extend beyond the expiration date of Pat. No. 5,490,750.

[21] Appl. No.: 528,479

[22] Filed: Sep. 14, 1995

Related U.S. Application Data

[63] Continuation-in-part of Ser. No. 257,838, Jun. 9, 1994, Pat. No. 5,490,750.
[51] Int. Cl.⁶ .............................. F16B 13/06; F16B 37/04
[52] U.S. Cl. .................... 411/55; 411/73; 411/180; 411/902
[58] Field of Search .......................... 411/55, 57, 60, 411/71–73, 902, 903, 908, 901, 178, 180, 82

[56] References Cited

U.S. PATENT DOCUMENTS

| 702,255 | 6/1902 | Stockman | 411/60 |
|---|---|---|---|
| 4,360,301 | 11/1982 | Mosberger | 411/73 X |
| 4,840,522 | 6/1989 | Kurihara | 411/903 X |
| 5,085,547 | 2/1992 | Vanotti | 441/178 X |
| 5,345,734 | 9/1994 | Tremblay | 411/903 X |
| 5,490,750 | 2/1996 | Gundy | 411/55 |

FOREIGN PATENT DOCUMENTS

| 2434713 | 2/1976 | Germany | 411/73 |

*Primary Examiner*—Neill R. Wilson
*Attorney, Agent, or Firm*—Daniel J. Bourque; Kevin J. Carroll

[57] ABSTRACT

An anchoring device for anchoring a threaded member such as a screw or bolt in a substrate material includes an anchoring sheath for receiving the threaded member. The anchoring sheath includes annular anchoring ribs formed around a body portion of the anchoring sheath and at least one longitudinal rib extending along at least a portion of the body portion of the anchoring sheath and extend outwardly from the anchoring sheath. In a sheath with more than one longitudinal rib, the longitudinal ribs lie in different planes which intersect at the longitudinal axis of the anchoring sheath. The anchoring sheath preferably includes top and bottom regions which have no annular or longitudinal ribs. The bottom region can have an extended length to accommodate threaded members of varying lengths and a hole providing drainage of water, ice, or other debris as the threaded member is tightened into the sheath. The top region can further include a sleeve positioned around the sheath to match the modulus of elasticity of at least the top portion of the anchoring sheath to that of the substrate, and to prevent fractures in the substrate caused by stress in the substrate. The anchoring sheath may be coated with a resilient, elastomeric layer.

23 Claims, 4 Drawing Sheets

ANCHORING DEVICE FOR A THREADED MEMBER

This application is a continuation-in-part U.S. patent application Ser. No. 08/257,838 filed Jun. 9, 1994, now U.S. Pat. No. 5,490,750.

FIELD OF THE INVENTION

This invention relates to an anchoring devi for anchoring a threaded member in a substrate material.

BACKGROUND OF THE INVENTION

Prior art devices exist which fix screws nd other threaded members in a substrate such as an agglomerated material including concrete, plaster and epoxy. Two such screw fixing devices are disclosed in U.S. Pat. Nos. 4,085,652 and 5,085,547. The prior art screw fixing devices include a sheath into the substrate and into which the screw is threaded.

While the sheaths of the above-referenced devices enable the screw to be secured in the substrate, such scew fixing devices have some deficiencies. U.S. Pat. No. 4,085,652, for example, discloses an anchoring device with an overmolded sheath FIG. 1, which has circular ribs and four axial ribs. However, this design of the overmolded sheath makes the screw impossible to remove.

U.S. Pat. No. 5,085,547 improves the screw fixing device by providing a plastic sheath, FIG. 2, into which a screw is threaded and adds a metal sheath surrounding the plastic sheath. The metal sheath is embedded in the substrate and has longitudinal ribs which prevent the sheath from rotating when the screw is threaded into the plastic sheath (FIG. 2). The design of the sheath in the previous screw fixing devices having two longitudinal ribs which are positioned opposite each other is disadvantageous. The longitudinal ribs can create fragile zones 1, Prior Art FIG. 1, in a substrate such as concrete where moisture and stresses on the screw may cause cracking in the substrate. Because the longitudinal ribs lie in the same plane, the fragile zones in the substrate also lie in the same plane and the forces acting on the screw and sheath will be concentrated in that plane causing potentially serious substrate cracking.

Furthermore, the longitudinal ribs of the screw fixing devices extend too close to the top and bottom of the screw fixing sheath. Having the longitudinal ribs close to the top of the screw fixing sheath causes fragile zones in the weaker top layer of the substrate which is more susceptible to fracturing by forces applied to the screw. Having the ribs extend to the bottom of the sheath below the end of the screw also causes fragile zones at the bottom area of the sheath.

Another problem with previous screw fixing devices involved the contamination of the interior of the sheath with water and other debris. During manufacturing and shipping of the screw fixing sheath, water and debris could enter the threaded interior of the sheath causing problems when a screw is threaded into the sheath. Moreover, the accumulation of water and/or ice in the bottom of the sheath after the sheath has already been embedded in a substrate creates even more serious problems. The water and/or ice inhibits the screw or bolt from being completely threaded into the sheath and causes cracking in the sheath and surrounding substrate when tightened. A further contamination problem occurs after the screw or bolt has been threaded into the sheath when water can seep in around the screw or bott threads causing corrosion and damage from expansion when the water freezes.

Another problem occurs when screw fixing devices having plastic sheaths are used in pre-stressed concrete, such as railroad ties. Typically, concrete is pre-stressed by tensioning steel strands tightly in a mold, pouring concrete into the mold around the anchoring sheaths, and cutting the ends of the steel strands after the concrete has begun to set. When cut, the strands constrict and pull inwardly, causing the concrete around the anchoring sheath to exert compression stresses on the sheath. As a result of the stresses in the pre-stressed concrete and as a result of the anchoring sheath not having a modulus of elasticity which closely matches that of concrete, the flexible top region of the prior art anchoring sheath will flex or contract, thereby causing fractures in the concrete around the anchoring sheath.

Accordingly, what is needed is a screw fixing or anchoring device having a sheath which does not create fractures and fragile zones in the substrate where forces may be concentrated in a plane, causing the substrate to fracture.

SUMMARY OF THE INVENTION

The present invention is directed to an anchoring device for anchoring a threaded member in an agglomerated or other type of substrate material, such as concrete, plaster or epoxy. In one embodiment, at least one longitudinal rib is spaced around an anchoring sheath for distributing the forces and preventing forces from concentrating in a single plane in the substrate, and for preventing the sheath from rotating when a screw is threaded into or removed from the sheath. A reinforcing sleeve is positioned around at least a top region of the anchoring sheath to withstand stresses in a pre-stressed substrate material and thereby reduce the zones in the substrate which are susceptible to being fractured at the top and bottom of the anchoring sheath. A sealable opening in the screw fixing sheath prevents damage from water and other debris, and a hole in the bottom of the sheath allows water, ice and other debris to drain while tightening the screw or bolt.

The anchoring device includes an anchoring sheath which is fixed in the substrate material and receives the threaded member. The anchoring sheath has a first end, a second end, and a body portion disposed between the first and second ends. The anchoring sheath includes a plurality of annular anchoring ribs formed around the body portion for preventing the anchoring sheath from being removed or pulled out from the substrate material.

In the preferred embodiment, the anchoring sheath is made of a plastic material, such as nylon material. The anchoring sheath may include an elastomeric or resilient type coating formed directly on the plastic material, such as a resilient rubber type coating or a resilient plastic coating. Alternatively, the elastomeric or resilient type coating may be in the form of a sheet which is wrapped and heat shrunk around the anchoring sheath.

The anchoring sheath includes at least one longitudinal rib extending along at least a segment of the body portion of the anchoring sheath. In one embodiment, the longitudinal ribs extend from a top annular anchoring rib to a bottom annular anchoring rib. The preferred embodiment includes at least three longitudinal ribs, each lying in different planes which intersect at the longitudinal axis of the anchoring sheath. In one embodiment, the anchoring sheath includes four annular anchoring ribs and includes three longitudinal ribs having a generally triangular cross section and spaced around the body portion of the anchoring sheath at approximately 120 degrees apart.

The anchoring sheath includes a top region between the first end of the anchoring sheath and a top annular rib of the plurality of anchoring ribs. The top region includes an exterior surface having no annular anchoring rib or longitudinal rib, and extending from the top annular rib to the first end. The preferred embodiment of the anchoring sheath further includes a cylindrical bottom region with no anchoring rib or no longitudinal rib between the second end of the anchoring sheath and a bottom annular rib of the plurality of annular anchoring ribs.

In one embodiment, the top region includes a shoulder having a top surface which is flush with the first end of the anchoring sheath. A water-tight seal member formed of elastomeric or rubber type material is provided proximate the shoulder. In an alternative embodiment, the interior surface of the top region includes an annular shaped sealing member which forms a watertight seal with a sealing cap or plug which has been inserted into the anchoring sheath or a sheath cap.

In another embodiment, at least a top portion of the anchoring sheath has a modulus of elasticity that closely matches a modulus of elasticity of the substrate material. Preferably, a rigid sleeve is provided over at least the top region or over the entire anchoring sheath, to reinforce the anchoring sheath and provide at least the top region of the anchoring sheath with a modulus of elasticity generally the same as that of the substrate.

In another embodiment, the anchoring sheath includes a hole formed in the bottom region extending through the second end of the sheath in communication with the generally cylindrical internal region of the sheath. Preferably, the hole allows a rod portion of a form bolt threaded into the sheath to extend through the hole and into the substrate as the substrate is poured.

A further embodiment includes a bottom region having an extended length that is adapted to receive threaded members of varying lengths.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
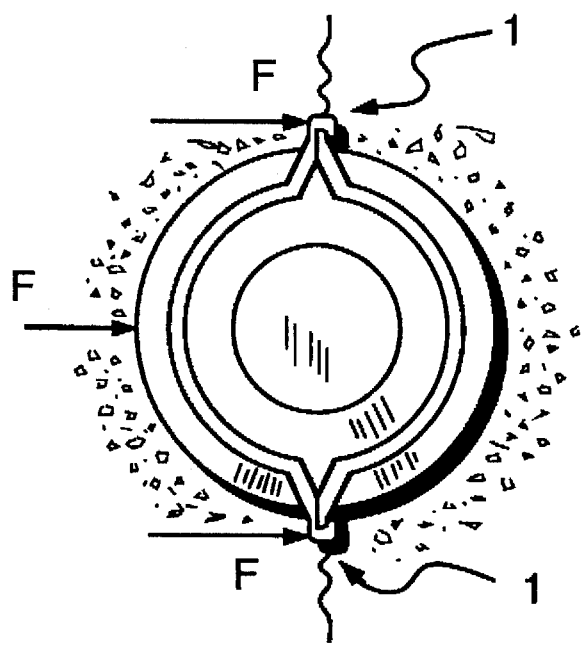
FIG. 1 is a top view of a prior art screw fixing device having two ribs lying in the same plane.
Figure 2:
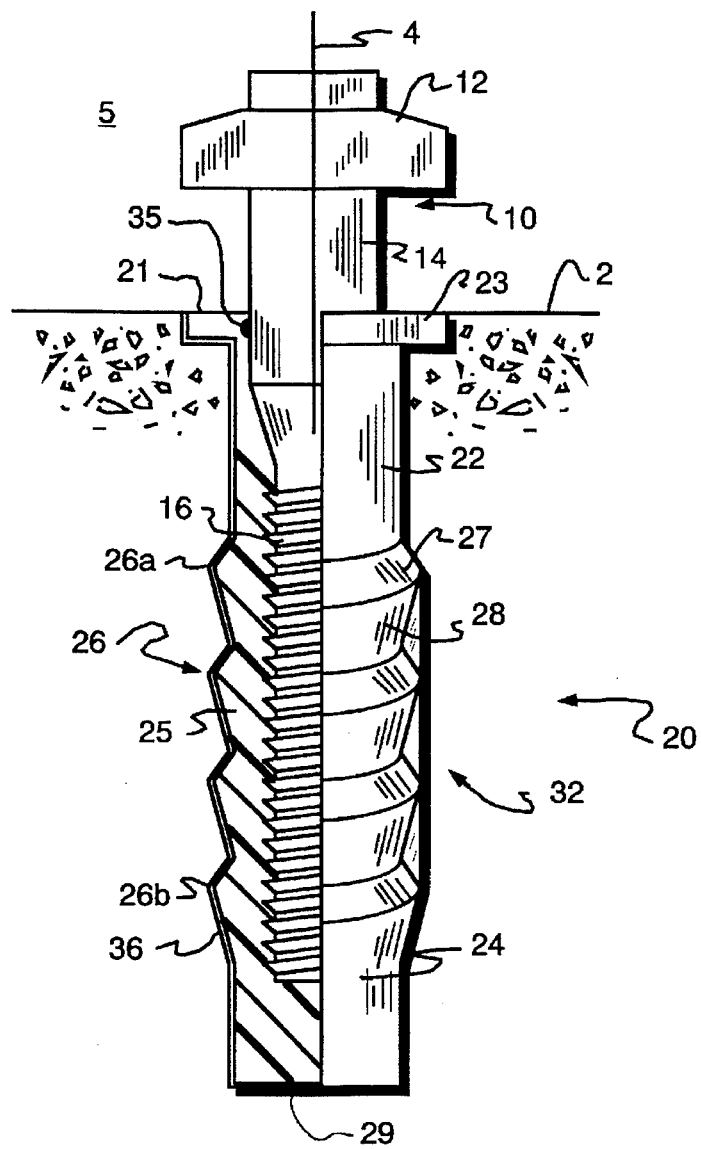
FIG. 2 is an axial half-section through an anchoring sheath of the anchoring device according to the present invention.

The anchoring system 5, FIG. 2, according to the present invention, includes an anchoring sheath 20 which is embedded in an agglomerated or other type of substrate material 2, such as plaster, concrete and epoxy. A threaded member 10, such as a screw, bolt or threaded stud, is inserted into the anchoring sheath 20 so that the threaded member 10 may be securely anchored in the substrate 2.

Typically, the threaded member 10 includes a head 12 and a rod or body portion 14 with threads 16 which are threaded into a threaded portion of a bore or internal region 34 in the anchoring sheath 20. In the preferred embodiment, threads 16 are buttress threads which offer superior resistance to cross threading when the threaded member 10 is being inserted into the sheath 20. Most importantly, the buttress thread offers superior resistance to forces applied to the anchoring device along the longitudinal axis, indicated generally by 4, of the threaded member 10 which might otherwise cause the threaded member 10 to be "pulled out" of the anchoring device.

The anchoring sheath 20 is preferably made of a plastic material which is preferably a reinforced plastic, such as glass fiber reinforced nylon. The anchoring sheath 20 includes one or more annular anchoring ribs 26 positioned along a body portion 25 of the anchoring sheath 20, for preventing the anchoring sheath 20 from being removed or pulled out from the substrate material 2. Each annular anchoring rib 26 preferably have a generally triangular cross section including a downwardly tapered top surface 27 which meets an upwardly and outwardly tapered bottom surface 28.

Figure 4:
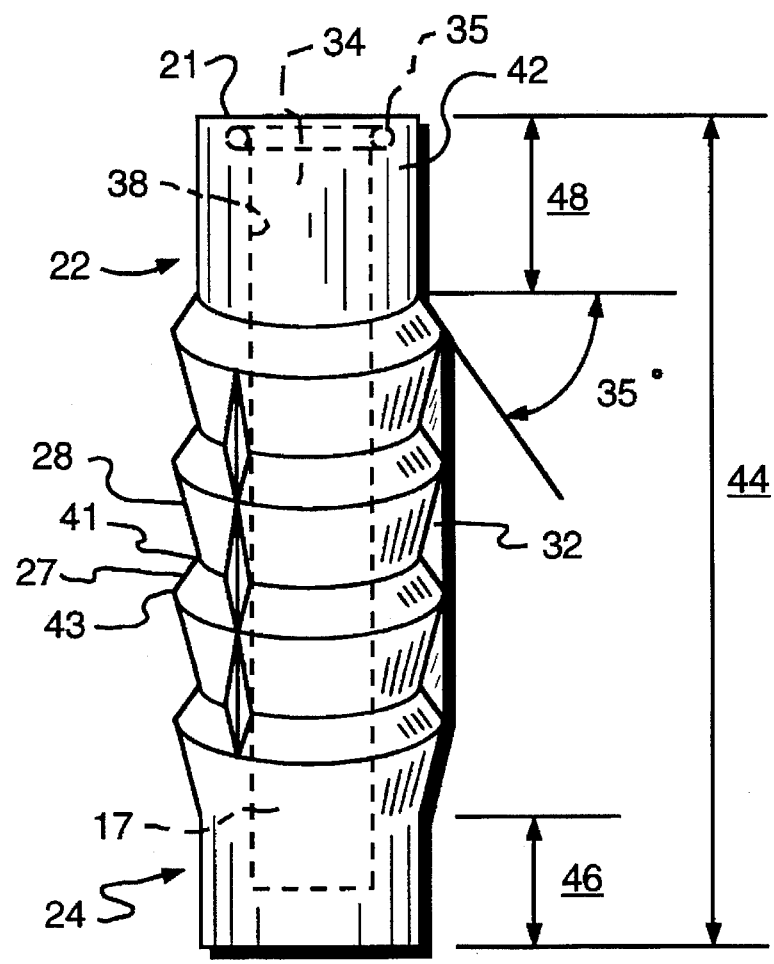
FIG. 4 is a side view of an anchoring sheath according to another embodiment of the present invention.

In the preferred embodiment, the downwardly tapered top surface 27 and outwardly tapered bottom surfaces 28 of the annular anchoring ribs form rib edges 43 and corner regions 41 which are slightly rounded, as shown in FIG. 4. The rib edge 43 and corner region 41 of each annular anchoring rib 26 are slightly rounded to allow a substrate material 2 to easily flow around the annular ribs 26 and to prevent voids or pockets in the substrate material 2 to ensure maximum contact between the substrate material 2 and the anchoring sheath 20. Typically, the top surface 27 of each annular anchoring rib 26 is tapered at approximately a 35 degree angle (FIG. 4).

The anchoring sheath 20 further includes one or more longitudinal ribs 32 which extend along at least a segment of the body portion 25 of the anchoring sheath 20, to prevent the anchoring sheath from rotating in the substrate material 2 when the threaded member 10 is threaded into or out of the sheath 20. In one embodiment, longitudinal ribs 32 extend parallel to a longitudinal axis 4 of the anchoring sheath 20 from a top surface 27 of top annular rib 26a to a top surface 27 of bottom annular rib 26b (FIGS. 2 and 4).

Figure 3:
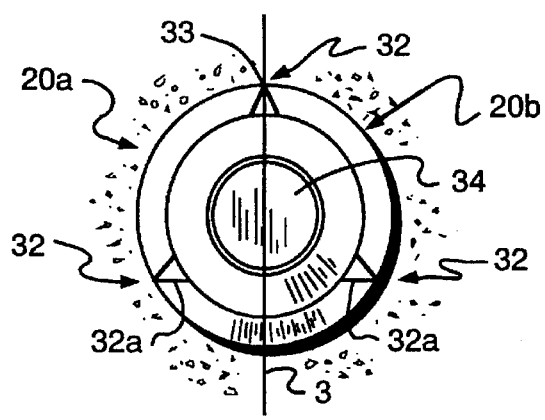
FIG. 3 is a top view of the anchoring sheath according to the present invention.

Each longitudinal rib 32 also extends outwardly from the anchoring sheath to an outer edge 33 of the longitudinal rib 32 which is generally approximately flush with rib edges 43 of the annular ribs 26, as shown in FIG. 3. Typically, the longitudinal ribs 32 each have a generally triangular cross-section (FIG. 3) although other shapes are within the scope of the present invention.

In the preferred embodiment, the anchoring sheath 20 includes three longitudinal ribs 32 which are spaced approximately 120 degrees apart around the body portion 25 of the anchoring sheath 20 as shown in FIG. 3. In this embodiment, each longitudinal rib 32 lies in a plane which intersects the longitudinal axis 4 of the anchoring sheath 20 and none of the longitudinal ribs 32 lie in the same plane intersecting the longitudinal axis 4 of the anchoring sheath 20.

In the preferred embodiment, the sides 32a of two of the three or more longitudinal ribs 32 should lie in the same plane, as shown in FIG. 3. This will allow the anchoring sheath 20 to be molded using a two piece mold which separates along the plane of sides 32a of two of the longitudinal ribs. One piece of the mold forms a first portion 20a of the anchoring sheath 20 while a second piece of the mold forms a second portion 20b of the anchoring sheath. After the sheath material has hardened, the two pieces may easily be separated along this longitudinal plane 3.

Other embodiments may include more than three longitudinal ribs. It is preferable that no two longitudinal ribs lie in the same plane intersecting the longitudinal axis 4 of the anchoring sheath 20. Having the longitudinal ribs 32 lie in different planes on the anchoring sheath 20 allows the forces on the anchoring sheath 20 and the resulting forces on the longitudinal ribs 32 to be distributed evenly throughout the surrounding substrate material preventing concentration in a single plane and fracturing of the substrate material.

In the preferred embodiment, the anchoring sheath 20 further includes a top region 22 without both annular ribs and longitudinal ribs. The top region 22 extends from a top annular anchoring rib 26a to a first end 21 of the anchoring sheath 20. In one embodiment shown in FIG. 2, the top region 22 includes a top shoulder 23 having a top surface flush with the first end 21 of the anchoring sheath 20. In an alternative embodiment shown in FIG. 4, the top region 22 includes an exterior surface 42 which extends from the top annular anchoring rib 26a straight to the first end 21 of the anchoring sheath 20 without any ribs or shoulders. This top region 22 having no annular anchoring ribs or longitudinal ribs reduces forces in the top layer of the substrate material 2 which is more susceptible to fracturing.

The bore 34, FIGS. 3 and 4, in the top region 22 of the anchoring sheath 20 includes an interior surface 38. In the preferred embodiment, this interior surface 38 includes a groove having a neoprene, rubber or other similar elastomeric type sealing ring 35, such as an "O" ring, positioned in the groove so as to contact the rod 14 of a threaded member 10 which is threaded in the anchoring sheath 20 (see FIG. 2). The sealing ring 35 forms a water-tight seal with the threaded member 10 or a cap or plug 52, FIG. 5, to prevent water and other debris from entering the bore 34 of the anchoring sheath 20 and causing damage.

Figure 5:
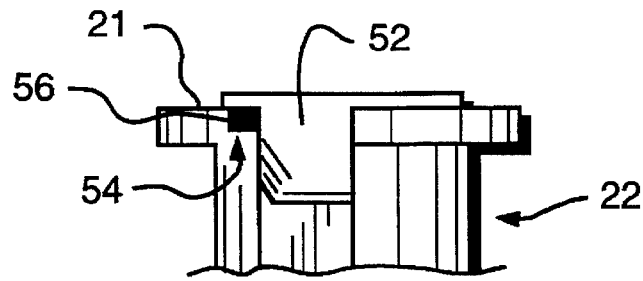
FIG. 5 is a partial side view of an anchoring sheath having a water-tight seal plug according to another embodiment of the present invention.

In the preferred embodiment, shown in FIG. 5, a groove or cavity 54 is formed with an elastomeric type seal member 56 at the first end 21 of the anchoring sheath 20. A plug or cap 52 may be inserted into the bore 34 of the anchoring sheath 20 adjacent the seal 56 for eliminating water and debris from entering the anchoring sheath during manufacturing, shipping or use.

The preferred embodiment of the anchoring sheath 20 also includes a bottom region 24 which has no annular anchoring ribs and which has a cylindrical surface extending from the bottom annular anchoring rib 26b to a second end 29 of the anchoring sheath 20 (FIG. 2). This bottom region 24 includes a pocket 17 which is threaded and allows for a greater range of bolt lengths (see FIGS. 2 and 4).

Figure 6:
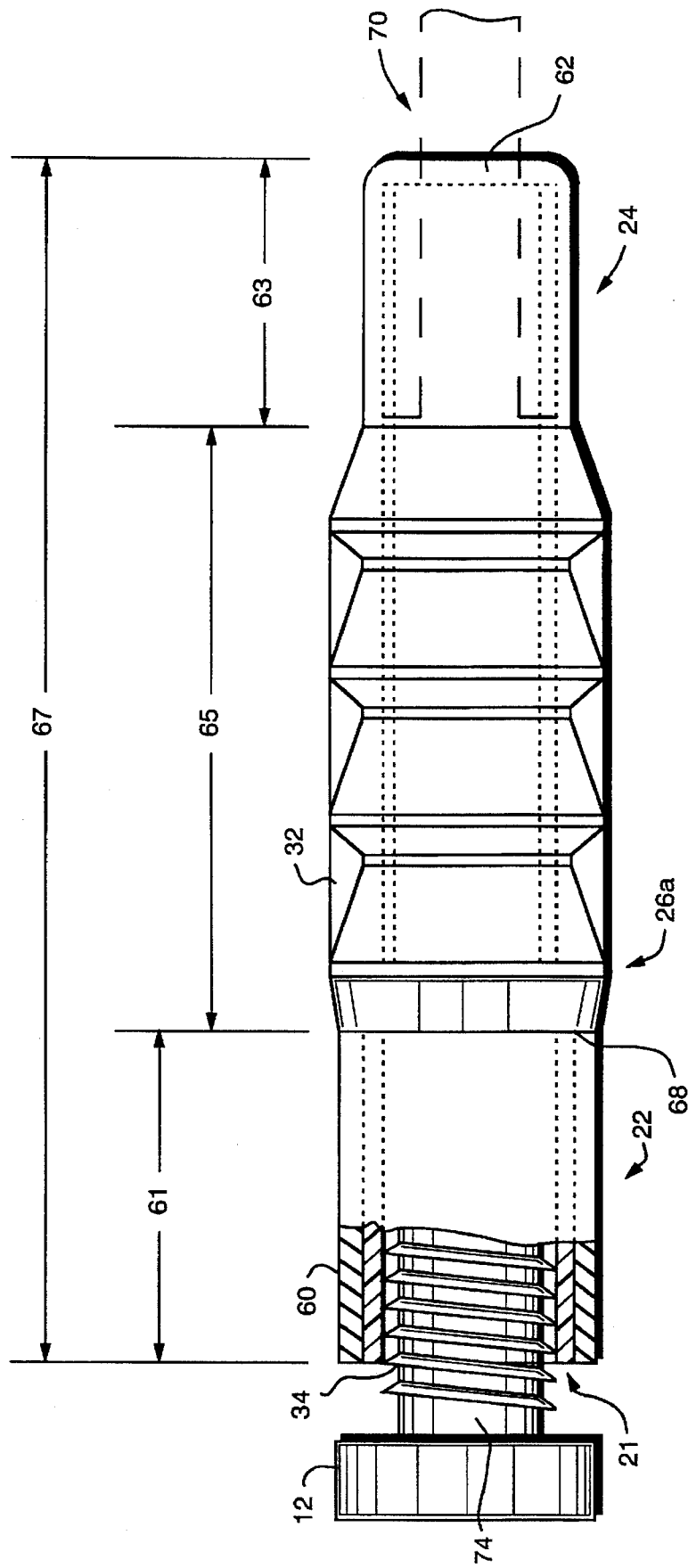
FIG. 6 is a partial cut away view of an anchoring sheath according to a further embodiment having a metal sleeve positioned around the top region.

In the preferred embodiment, the anchoring sheath 20 includes a sleeve 60, FIG. 6, positioned generally around the top region 22 of the anchoring sheath 20. The sleeve 60 insures that at least the top region 22 of the anchoring sheath 20 has a modulus of elasticity which is generally the same as that of the substrate, such as concrete. The sleeve 60 therefore reinforces the anchoring sheath, typically made of a plastic material, at the top region 22 where the anchoring sheath is susceptible to the stresses exerted by the substrate material, such as in a pre-stressed concrete structure.

Typically, the sleeve 60 is made of a metal or similar rigid material that has a modulus of elasticity close to that of the concrete or other substrate material. Accordingly, the sleeve 60 is able to withstand higher compression forces than the typical plastic material of the anchoring sheath 20 having a modulus of elasticity that does not match that of the concrete or substrate material. Thus, the sleeve 60 prevents the sheath 20 from flexing or contracting and thereby prevents the surrounding substrate material from cracking.

In the embodiment shown in FIG. 6, the sleeve 60 extends from the first end 21 to the top of shoulder 68 of the sheath proximate a top annular anchoring rib 26a. The present invention also contemplates using the sleeve 60 around the top region 22 of an anchoring sheath 20 having a top shoulder 23 (FIG. 2) and on the top region 22 of an anchoring sheath 20 having no shoulder portions (FIG. 4).

One method of making an anchoring sheath 20 having a sleeve 60 reinforcing the top region 22 is to provide the sleeve 60 in a mold, and to mold the plastic anchoring sheath 20 inside of the sleeve 60. The length of the sleeve 60 generally depends on the size of the anchoring sheath 20 and should be sufficient to prevent flexing in at least the top region 22 of the anchoring sheath 20 and stress cracking in the prestressed concrete around at least the top region 22 of the anchoring sheath 20.

In one example, the sleeve 60 has a length 61 of about 1 ¾ inches. The thickness of the sleeve 60 also depends on the size of the anchoring sheath 20 and the amount of stress exerted by the substrate material. In one example, the sleeve 60 has a thickness of approximately ⅛ inches.

A further embodiment of the anchoring sheath 20 includes an extended bottom region 24' to accommodate various bolt lengths. Having an extended bottom region 24' in an anchoring sheath 20 provides added versatility by eliminating the need for anchoring sheaths of varying lengths. Preferably, the threaded portion of internal region 34 extends into the extended bottom region 24'. In one example, the extended bottom region 24' has a length 63 of approximately 1¼ inches.

A further embodiment of the bottom region 24, 24' of an anchoring sheath includes a hole 62 in the anchoring sheath for draining water, ice and other debris when the threaded member or bolt 12 is inserted and tightened in the sheath 20. Preferably, the hole 62 is formed at the bottom of the sheath 20, to allow a rod or tip portion 70 (shown in phantom in FIG. 6) of a threaded member 12 to extend through the hole 62 and form a drain hole in the concrete or other substrate material when the substrate is poured around the sheath 20 and rod portion 70. After the sheath 20 is embedded in the substrate, the threaded member 12 with rod portion 70 is removed leaving a drainage hole extending through the substrate.

One example is a form bolt 12 used during casting operations and having a threaded portion 74 and a rod portion 70. The form bolt 12 is threaded into the sheath 20 and anchors the sheath while the substrate is poured around the sheath 20 and rod portion 70. After the substrate 2 sets, the form bolt 12 can be removed leaving a drainage hole in the hardened substrate formed by the rod portion 70.

Such an anchoring sheath and rod assembly is particularly useful when anchoring sheaths 20 are used in concrete railroad ties. Any water, ice or debris accumulated in the sheath 20 embedded in concrete railroad tie prior to threading a bolt or similar threaded member in the sheath will be forced out of the hole 62 in the sheath and the drainage hole in the concrete tie upon tightening the threaded member instead of exerting a force on the bottom region of the anchoring sheath and the surrounding concrete.

The number of annular anchoring ribs 26 and the dimensions of the anchoring sheath 20 will depend on the lengths of the threaded members which are used. For example, in the preferred embodiments shown in FIGS. 2, 4, and 6, the anchoring sheath has four annular anchoring ribs 26. In one example of the embodiment shown in FIG. 4, the length 44 of the anchoring sheath 20 is approximately 5 ½ inches to accommodate a ⅞ inch diameter bolt with a 3¼ to 4¼ inch threaded region, while the length 48 of the top region 22 is approximately 2.0 inches.

In one example of the embodiment shown in FIG. 6, the length 66 of the anchoring sheath 20 is approximately 6⅝ inches with a top region length 61 of approximately 1¾ inches, an annular rib region length 65 of approximately 3⅝ inches, and an extended bottom region length 63 of about 1¼ inches. Such an anchoring sheath as shown in FIG. 6 can accommodate thread engagement lengths ranging in length, for example, from 3¼" to 5½". The present invention, however, contemplates other embodiments of the anchoring sheath 20 including less than four or as many as seven or more annular anchoring ribs 26 depending on the range of lengths of the threaded members to be anchored.

The anchoring sheath 20 may further include an optional elastomeric or resilient coating 36, FIG. 2, formed directly on the plastic material to allow for expansion and contraction differential of the anchoring sheath 20 and the substrate 2, and for providing an even distribution of load between the anchoring sheath and the substrate. Preferably, the resilient coating is applied by dipping or spraying the anchoring sheath 20 with elastomeric or resilient material and allowed to dry. Alternatively, an elastomeric or resilient type of coating comprising a sheet of material may be wrapped around the anchoring sheath and shrink wrapped around the anchoring sheath.

Resilient or elastomeric coatings may be utilized including, for example, natural and synthetic rubber materials such as latex, neoprene, butyl, nitrile, as well as resilient plastic coatings including, for example, the family of thermal plastic elastomers (TPE) such as Polyvinyl Chloride (PVC), polyimides, etc. This list is not considered to be limiting but is presented to illustrate those types of coatings which are considered to be within the scope of the present invention.

Modifications and substitutions by one of ordinary skill in the art are considered to be within the scope of the present invention which is not to be limited except by the claims which follow.

What is claimed is:

1. An anchoring device for anchoring a threaded member in a substrate material, comprising:
    an anchoring sheath having a first end, a second end, and a body portion disposed between said first and second ends, said anchoring sheath adapted to be fixed in said substrate material and to receive a threaded member;
    a plurality of annular anchoring ribs formed around the body portion of said anchoring sheath;
    a rigid sleeve positioned around at least a portion of said body portion of said anchoring sheath, for reinforcing said anchoring sheath when anchored in said substrate material; and
    at least three longitudinal ribs extending along at least a segment of said body portion of said anchoring sheath, and extending outwardly from said anchoring sheath, wherein each of said at least three longitudinal ribs are disposed in different planes which intersect at a longitudinal axis of said anchoring sheath.

2. An anchoring device for anchoring a threaded member in a substrate material, comprising:
    an anchoring sheath having a first end, a second end, and a body portion disposed between said first and said second end, said anchoring sheath adapted to be fixed in said substrate material and to receive a threaded member;
    a plurality of annular anchoring ribs formed around the body portion of said anchoring sheath;
    said body portion of said anchoring sheath including a top portion disposed generally between said first end of said anchoring sheath and a first annular anchoring rib of said plurality of annular anchoring ribs, said top portion having a modulus of elasticity that closely matches a modulus of elasticity of said substrate material, for preventing compression of said top portion; and
    at least one longitudinal rib extending along at least a segment of said body portion of said anchoring sheath, said at least one longitudinal rib extending outwardly from said anchoring sheath.

3. The anchoring device of claim 2 further including at least three longitudinal ribs, wherein each of said three longitudinal ribs are disposed in different planes which intersect at a longitudinal axis of said anchoring sheath.

4. The anchoring device of claim 2, wherein said top portion includes a rigid sleeve extending generally between said first end and said first annular anchoring rib, for providing said modulus of elasticity that closely matches a modulus of elasticity of said substrate material.

5. The anchoring device of claim 3, wherein said at least three longitudinal ribs include three longitudinal ribs spaced around the body portion of said anchoring sheath at approximately 120 degrees apart.

6. The anchoring device of claim 2, wherein said anchoring sheath is made of a nylon material.

7. The anchoring device of claim 2, further including a coating formed on at least a portion of an exterior region of said anchoring sheath.

8. The anchoring device of claim 7, wherein said coating includes a resilient coating.

9. The anchoring device of claim 2, wherein said top portion is devoid of an annular anchoring rib and extending straight from said first annular anchoring rib of said plurality of annular anchoring ribs to said first end of said anchoring sheath.

10. The anchoring device of claim 2, further including a top shoulder having a top surface flush with said first end of said anchoring sheath wherein said top portion extends from said top shoulder to said top annular anchoring rib.

11. The anchoring device of claim 2, further including a bottom shoulder proximate said to annular anchoring rib, wherein said top portion extends from said first end to said bottom shoulder.

12. The anchoring device of claim 2, further including a bottom region between said second end of said anchoring sheath and a bottom annular rib of said plurality of annular anchoring ribs, wherein said bottom region is devoid of annular anchoring ribs.

13. The anchoring device of claim 2, wherein each of said plurality of annular anchoring ribs have a generally triangular cross-section.

14. The anchoring device of claim 2, wherein each of said at least one longitudinal ribs have a generally triangular cross-section.

15. The anchoring device of claim 2, wherein said threaded member includes buttress threads, and a threaded portion of an interior region of said anchoring sheath is adapted to receive a buttress threaded member.

16. An anchoring system for anchoring a threaded member in an substrate material, comprising:

an anchoring sheath adapted to be fixed in a substrate material, said anchoring sheath including a first end, a second end, and a body portion disposed between said first and second end;

a plurality of annular anchoring ribs formed around the body portion of said anchoring sheath;

at least one longitudinal rib extending along at least a segment of said body portion of said anchoring sheath and outwardly from said anchoring sheath;

said anchoring sheath including a generally cylindrical internal region extending from said first end toward said second end, said generally cylindrical internal region including a threaded portion adapted to receive a threaded member;

said anchoring sheath including a top region disposed between said first end of said anchoring sheath and a top annular rib of said plurality of annular ribs; and said anchoring sheath including a bottom region disposed between said second end of said anchoring sheath and a bottom annular rib of said plurality of said annular anchoring ribs, said bottom region including a hole extending through said second end in communication with said generally cylindrical internal region.

17. The anchoring system of claim 16, further including a form bolt having a threaded bolt portion for engaging said threaded portion of said generally cylindrical internal region and a rod portion for extending through said hole in said bottom region, whereby said form bolt anchors said anchoring sheath in a form when pouring said substrate material.

18. The anchoring system of claim 16, wherein a top portion of said body portion of said anchoring sheath, disposed generally between said first end of said anchoring sheath and said top annular rib, has a modulus of elasticity that closely matches a modulus of elasticity of said substrate material.

19. The anchoring system of claim 16, further including a resilient coating formed directly on said anchoring sheath covering at least a portion of an exterior surface of said anchoring sheath.

20. The anchoring system of claim 16, including at least three longitudinal ribs extending along at least a segment of the body portion of said anchoring sheath parallel to a longitudinal axis of said anchoring sheath and extending outwardly from said anchoring sheath, each of said at least three longitudinal ribs disposed in different planes which intersect at the longitudinal axis of said anchoring sheath.

21. The anchoring system of claim 16, wherein said bottom region has an extended length, whereby said anchoring sheath having said bottom region with an extended length is adapted to receive and anchor threaded members of varying lengths.

22. An anchoring device for anchoring a threaded member in a substrate material, comprising:

an anchoring sheath having a first end, a second end, and a body portion disposed between said first and said second end, said anchoring sheath adapted to be fixed in said substrate material and to receive a threaded member;

a plurality of annular anchoring ribs formed around the body portion of said anchoring sheath;

said body portion of said anchoring sheath including a top portion disposed generally between said first end of said anchoring sheath and a first annular anchoring rib of said plurality of annular anchoring ribs;

a rigid sleeve disposed substantially tightly around said top portion of said body portion, for preventing compression of said top portion; and at least one longitudinal rib extending along at least a segment of said body portion of said anchoring sheath, said at least one longitudinal rib extending outwardly from said anchoring sheath.

23. The anchoring device of claim 22 wherein said rigid sleeve is disposed only on said top portion of said body portion.

* * * * *